Figure 1:
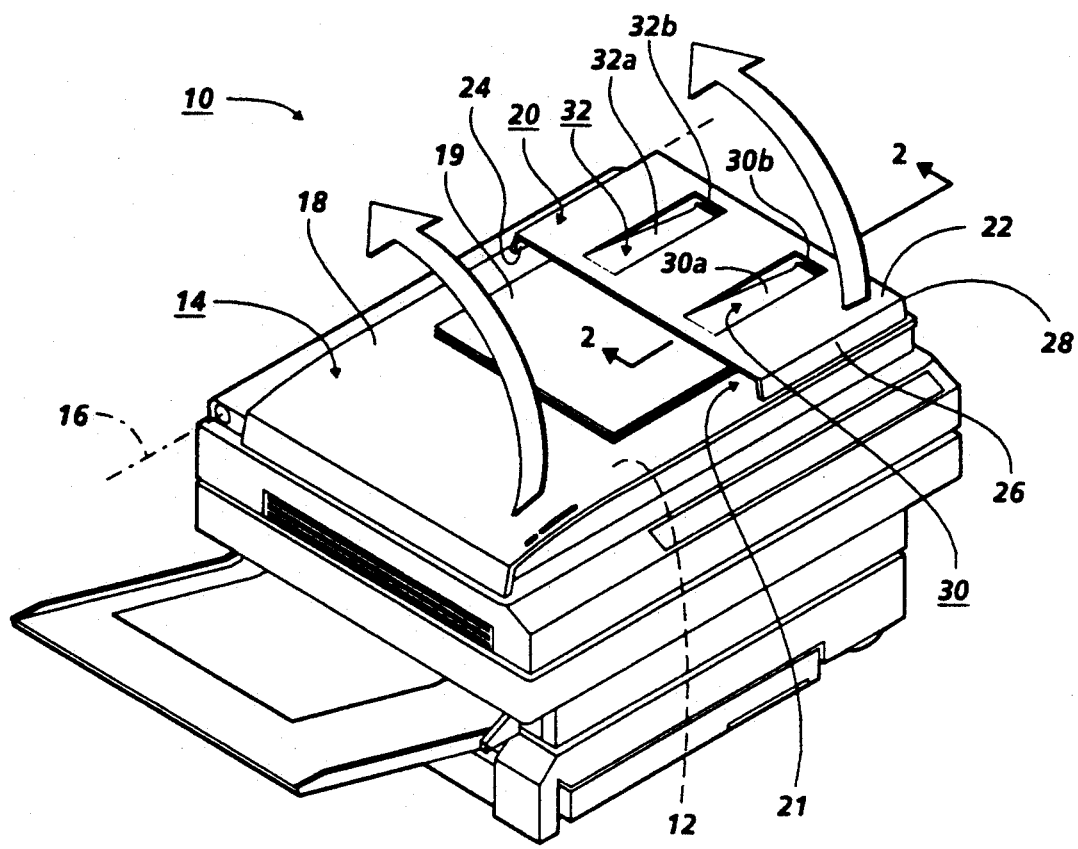

United States Patent [19]
Greene

[11] Patent Number: 5,250,981
[45] Date of Patent: Oct. 5, 1993

[54] COPIER OR SCANNER PLATEN COVER DOCUMENTS RETAINER

[75] Inventor: Harold O. Greene, Rochester, N.Y.

[73] Assignee: Xerox Corporation, Stamford, Conn.

[21] Appl. No.: 928,569

[22] Filed: Aug. 13, 1992

[51] Int. Cl.⁵ .................... G03B 27/62; G03B 27/64
[52] U.S. Cl. .................................... 355/76; 355/231
[58] Field of Search .............. 355/75, 76, 133, 231

[56] References Cited

U.S. PATENT DOCUMENTS

| | | | |
|---|---|---|---|
| 4,053,223 | 10/1977 | Nebiker et al. | 355/75 |
| 4,444,493 | 4/1984 | Webster et al. | 355/75 |
| 4,624,556 | 11/1986 | Rodriguez | 355/75 |
| 5,012,283 | 4/1991 | Shimono et al. | 355/229 |
| 5,060,019 | 10/1991 | Fukunaga | 355/231 |

Primary Examiner—Richard A. Wintercorn

[57] ABSTRACT

In a pivotably liftable platen cover unit for a copier or scanner, wherein the platen cover unit has an upper surface and at least one pocket for document sheets, the document retaining pocket provides an integral document retaining surface when the platen cover unit is lifted, and integral springs retain documents in the pocket when the platen cover unit is raised. The pocket preferably has a roof member spaced above the upper surface, and the springs are integral unitary extensions of the roof member which extend towards the upper surface of the platen cover unit within the pocket. Preferably, the document holding springs comprise two spaced apart, elongated cantilevered angled arms positioned to gradually engage document sheets in the pocket with document rounded surfaces spaced less than 20 centimeters apart at the ends of the arms.

4 Claims, 1 Drawing Sheet

COPIER OR SCANNER PLATEN COVER DOCUMENTS RETAINER

There is disclosed herein an improvement in reproducing machines, and more particularly an improved, low cost platen cover document retention system.

The system disclosed herein improves the usability of the upper surface of a platen cover unit for a copier or scanner (which platen cover unit may also be a document feeder) as a work surface on which documents sheets may be placed, without the usual problem of such documents falling or being thrown off of the platen cover unit upper surface when the platen cover unit is raised to provide access to the platen for document copying or document removal from the platen.

In particular, there is disclosed in the example herein a positive document retention system for the upper surface area of a pivotal platen cover unit by which documents may be positively retained even if the platen cover unit is rapidly pivoted open to a near vertical position, during or after copying operations (as is typical). This disclosed exemplary positive documents retention system includes a document retaining pocket (or at least partially enclosed tray) with a rear wall for document retention, which becomes a pocket bottom document retaining surface when the platen cover unit is lifted open, in combination with a positive document spring retention system. The disclosed positive spring retention system preferably comprises low cost leaf springs integrally molded into the document retaining pocket area. The disclosed document retaining spring system is preferably designed to positively press the otherwise loose documents down against the upper work surface of the platen cover unit to greatly assist in preventing the documents from sliding out of the retaining pocket and/or off of the platen cover unit when the platen cover unit is lifted.

Various prior art systems have attempted to provide platen cover unit document pockets and/or work surfaces, as further disclosed hereinbelow. The Xerox Corporation "5014" and "5012" copiers are among various examples of copiers with platen covers with document pockets.

A specific feature of the specific embodiment disclosed herein is to provide in a pivotably liftable platen cover unit for a copier or scanner, wherein said platen cover unit has an upper surface and at least one pocket for document sheets, the improvement comprising: a document retaining pocket providing an integral document retaining surface when the platen cover unit is lifted, and integral spring retaining means for retaining documents in said pocket when said platen cover unit is lifted.

Further specific features provided by the system disclosed herein, individually or in combination, include those wherein said pocket has a roof member spaced above said upper surface, and said spring retaining means are integral extensions of said roof member of said pocket which extend towards said upper surface of said platen cover unit and/or wherein said spring retaining means comprises two spaced apart cantilevered spring elements positioned to engage document sheets within said pocket with document engagement surfaces less than 20 centimeters apart and/or wherein said spring retaining means comprises two spaced apart.

In the description herein the term "document" or "sheet" refers to a usually flimsy sheet of paper, plastic, or other such conventional individual image substrate. "Copier" as used in the claims herein is intended to broadly encompass various optical or digital document imaging devices, of which what are now called "scanners" can be encompassed.

Figure 2:
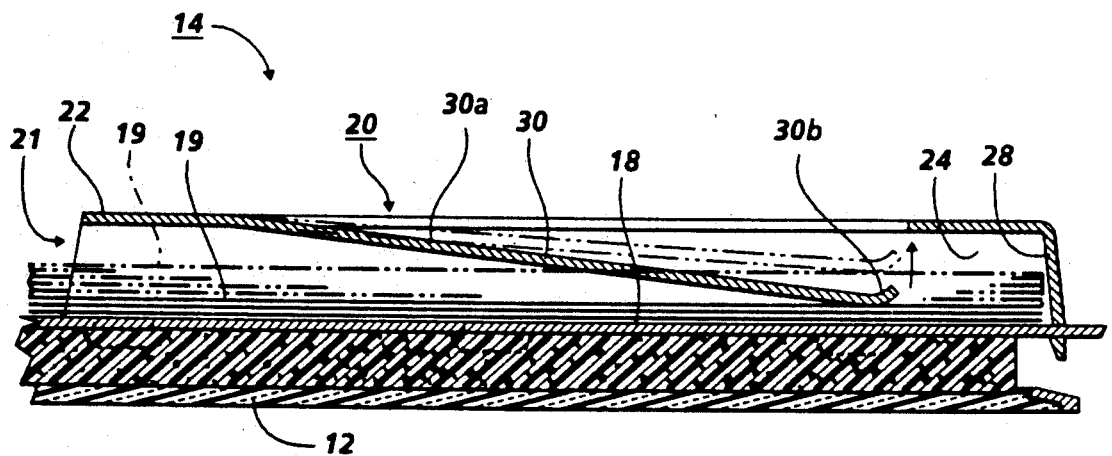

Various of the above-mentioned and further features and advantages will be apparent from the specific apparatus and its operation described in the example below. Thus, the present invention will be better understood from this description of an embodiment thereof, including the drawing figures (approximately to scale) wherein:

FIG. 1 is a frontal perspective view of an exemplary copier or scanner with an exemplary platen cover unit having integral positive document retaining system in accordance with the present invention; and FIG. 2 is an enlarged, partial cross-sectional view, taken along the line 2—2 of FIG. 1.

Referring to the Figures, there is shown, by way of one example, a conventional copier or scanner 10, having on its upper surface a platen 12 against which documents are laid or fed to be copied or scanned, conventionally. Accordingly, this need not be described herein. Conventionally overlying the platen 12 is a platen cover unit 14. As noted, this may be part of, or contain, a document handler or feeder. However, as is also well known, the platen cover unit may simply provide a light (illumination) background and document pressing surface for documents on the platen 12, and need not include automatic document feeding. The platen cover unit 14 here is conventionally pivotally mounted to the copier or scanner 10 by any suitable hinge system so as to conventionally pivot along the pivotal hinge line or axis 16 at the rear of the copier or scanner 10. [Lifting up of the platen cover unit 10 about axis 16 to a near vertical position is required for access to the platen for manual placement or removal of documents from the platen where they are imaged. Even with automatic document feeders, this may be required for jam clearances.]

It has been found over many years of experience that the operators of copiers or scanners (especially smaller ones) typically use the upper surface 18 of the platen cover unit 14 as a work surface on which to temporarily store documents (originals or copy sheets or service manuals) on which they are working. Because of this, many platen cover units include various types of document trays or pockets or wall surfaces thereon. However, there is a long standing problem in that when the platen cover unit 14 is pivotally raised up about the hinge line 16 in operation, as illustrated by the movement arrows in FIG. 1, the document sheets tend to fall off of or even be thrown off of the upper surface 18 of the platen cover unit, even if pockets or baffles are provided.

An example of a stack of documents 19 on the surface 18 is illustrated in both FIG. 1 and FIG. 2. In FIG. 2, an increased size or thickness of the set or stack of documents 19 is indicated in phantom.

Even if the work documents such as 19 do not completely fall off of the platen cover unit 14 when it is raised, they may flop around or become dislodged and relatively skewed relative to one another, because there is no positive retention of the documents in prior systems. Thus, the operators tend to be nervous about leaving any documents on the upper surface 18 of the platen cover unit 14 during normal operation. Often, however, there is no other convenient working surface in the immediate vicinity.

Turning now to the specific features and modifications of the disclosed embodiment, this platen cover unit 14 has an integral documents pocket 20 for at least partially retaining documents 19 therein, as illustrated. It may be seen that this documents pocket 20 extends parallel to the pivotal hinge line 16 about which the platen cover unit 14 opens. That is, the pocket 20 has an opening 21 perpendicular the hinge line 16. The pocket 20 here is formed by an at least partial pocket roof or ceiling 22, a pocket rear wall 24 extending substantially parallel and closely adjacent to the rear of the copier or scanner 10 parallel the hinge line 16, a pocket front wall 26, and a pocket end wall or bottom 28. As shown, the pocket roof 22 may be substantially planar, and thus, substantially evenly spaced above the upper or working surface 18 of the cover unit 14. As shown, the bottom surface of the pocket 20 is thus an extension of, or coextensive with, the upper surface 18 of the cover unit 14 so that the documents may be easily slid into the pocket 20 (here, from left to right, parallel the pivot axis 16). The pocket rear wall 24 here forms a document bottom retaining surface when the platen cover unit is raised.

Once the documents are inserted in the pocket 20, the portions extending therefrom are still clearly visible, so that the operator can see that documents are present in the pocket 20. If desired, the pocket roof 22, and the pocket rear wall 24, front wall 26 and end wall 28, may be a single unitary plastic molding, snapped in place on the platen cover unit 10 with extending tabs, as illustrated in FIG. 2 in phantom, or otherwise fastened to the cover unit. This integral molding or plate may be made of transparent or semi-transparent plastic so that any document in the pocket 20 is clearly externally visible to the operator.

Note particularly that there is provided here, integral the pocket 20, for retaining documents therein, integral spring members 30 and 32. Preferably, as shown here, two such spring members 30, 32 are provided, substantially spaced apart. However, it will be appreciated that the system is not limited to only two spring members.

The spring members 30, 32 here are elongated, cantilevered, leaf springs molded into the pocket roof 22, extending at a small angle downwardly from the roof 22 towards a pressing engagement with the upper surface 18 forming the floor of the pocket. A document or set of documents 19, as particularly shown in FIG. 2, may be easily slid under the springs 30, 32 by displacement of the elongate cantilevered arms 30a, 32a, thereof. Approximately one kilogram (two pounds) or less of spring force engagement has been found to be sufficient for document retention. Rounded engagement ends 30b, 32b on the ends of the cantilevered arms 30a, 32a provide the actual engagement of the springs 30, 32 with the document sheets, and allow the document sheets to be easily pulled out from under the springs when the operator desires to remove the documents from the pocket 20. As shown in phantom in FIG. 2, additional or thicker documents merely deflect the arms 30a, 32a slightly further. The long opening arms 30a, 32a provide relatively uniform spring force for various document set thicknesses, although desirably increasing somewhat for a thicker, and therefore heavier, sets.

It may be seen that the spring members 30, 32 add little or no incremental unit manufacturing cost to the platen cover unit 14, yet greatly improved operator convenience.

The spacing of the two springs 30, 32 document engagement surfaces 30b, 32b provides a force-couple or moment-arm retention force to resist skewing of document sheets simultaneously engaged by both. Thus, these surfaces 30b, 32b here are spaced apart by less than a normal document dimension, i.e., less than about 20 centimeters apart.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a pivotably liftable platen cover unit for a copier or scanner, wherein said platen cover unit has an upper surface and at least one pocket for document sheets, the improvement comprising:

a document retaining pocket providing an integral document retaining surface when the platen cover unit is lifted, and integral spring retaining means for retaining documents in said pocket when said platen cover unit is lifted.

2. The platen cover unit of claim 1, wherein said pocket has a roof member spaced above said upper surface, and said spring retaining means are integral extensions of said roof member of said pocket which extend towards said upper surface of said platen cover unit.

3. The platen cover unit of claim 1, wherein said spring retaining means comprises two spaced apart cantilevered spring elements positioned to engage document sheets within said pocket with document engagement surfaces less than 20 centimeters apart.

4. The platen cover unit of claim 2, wherein said spring retaining means comprises two spaced apart elongated cantilevered plastic spring arms positioned to engage document sheets with document engagement surfaces spaced less than 20 centimeters apart at the ends of said arms.

* * * * *